US011046007B2

(12) United States Patent
Kim et al.

(10) Patent No.: US 11,046,007 B2
(45) Date of Patent: Jun. 29, 2021

(54) APPARATUS AND METHOD FOR CALIBRATING OPTIMUM SIZE OF 3D PRINTING

(71) Applicant: GM GLOBAL TECHNOLOGY OPERATIONS LLC, Detroit, MI (US)

(72) Inventors: Hyeon Nam Kim, Seoul (KR); Nam Hun Kim, Ulsan (KR)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 538 days.

(21) Appl. No.: 15/566,538

(22) PCT Filed: Aug. 4, 2015

(86) PCT No.: PCT/KR2015/008127
§ 371 (c)(1),
(2) Date: Oct. 13, 2017

(87) PCT Pub. No.: WO2016/167416
PCT Pub. Date: Oct. 20, 2016

(65) Prior Publication Data
US 2018/0086001 A1  Mar. 29, 2018

(30) Foreign Application Priority Data
Apr. 16, 2015 (KR) .................. 10-2015-0053793

(51) Int. Cl.
*B29C 64/393* (2017.01)
*B33Y 30/00* (2015.01)
(Continued)

(52) U.S. Cl.
CPC ............ *B29C 64/393* (2017.08); *B22F 10/20* (2021.01); *B29C 67/00* (2013.01); *B33Y 30/00* (2014.12);
(Continued)

(58) Field of Classification Search
CPC ...................... B22F 3/00; B22F 2003/1057
See application file for complete search history.

(56) References Cited

U.S. PATENT DOCUMENTS

| 2004/0175686 | A1* | 9/2004 | Ono | A61L 27/443 |
|---|---|---|---|---|
| | | | | 434/274 |
| 2015/0266242 | A1* | 9/2015 | Comb | B29C 64/393 |
| | | | | 264/40.1 |

(Continued)

FOREIGN PATENT DOCUMENTS

| JP | 3146805 B2 | 5/1995 |
|---|---|---|
| JP | 2003175538 A | 6/2003 |

(Continued)

OTHER PUBLICATIONS

Tong, Parametric Error Modeling and Software Error Compensation for Rapid Prototyping, May 2005, The Pennsylvania State University, iii-iv, 2, 4-5, 12, 33-35, 50-54, 108,112, 133 (Year: 2005).*

(Continued)

*Primary Examiner* — Francisco W Tschen
*Assistant Examiner* — Elisa H Vera
(74) *Attorney, Agent, or Firm* — McNees Wallace & Nurick LLC

(57) ABSTRACT

The present invention relates to a three-dimensional printing optimal size correcting device and a correcting method. The present invention provides a three-dimensional printing optimal size correcting device comprising: a modeling composition module for modeling a printing target three-dimensionally, thereby composing a modeling file; a three-dimensional printing module for printing the composed modeling file three-dimensionally, thereby fabricating a target sample; a deformation data measurement module for measuring data regarding deformation of the fabricated target sample and rendering the same into a numerical value; and a size (Continued)

correction module for calculating a size correction algorithm formula from the deformation data, which has been rendered into a numerical value, through regression model analysis, wherein the size correction module corrects the modeling file according to the calculated size correction algorithm formula, and the three-dimensional printing module three-dimensionally prints the corrected modeling file, thereby fabricating the final target sample. The present invention is advantageous in that coefficients of a two-dimensional regression curve are calculated from data regarding size deformation in X-axis, Y-axis, and Z-axis directions, resulting from arrangement inside a three-dimensional printing device, a size correction algorithm formula is applied therefrom, and a correction is made in the opposite direction of the predicted bending, thereby providing a better bending deformation phenomenon correction effect than the prior art. The present invention is also advantageous in that it is possible to improve deformation, which cannot be controlled by a scale factor adjusting method, for example, which is provided by a three-dimensional printer control program itself.

4 Claims, 13 Drawing Sheets

(51) Int. Cl.
*B33Y 50/02* (2015.01)
*G05B 19/4099* (2006.01)
*B29C 67/00* (2017.01)
*B22F 10/20* (2021.01)
*B22F 10/30* (2021.01)

(52) U.S. Cl.
CPC .......... *B33Y 50/02* (2014.12); *G05B 19/4099* (2013.01); *B22F 10/30* (2021.01); *G05B 2219/49007* (2013.01)

(56) References Cited

U.S. PATENT DOCUMENTS

2016/0136896 A1* 5/2016 Wighton ................ B33Y 50/00 700/120
2017/0056138 A1* 3/2017 Zandinejad ........ A61C 13/0004

FOREIGN PATENT DOCUMENTS

KR 1019980063825 A 4/2000
KR 1020060097650 A 9/2006

OTHER PUBLICATIONS

N. Raghunath et al., "Improving Accuracy through Shrinkage Modelling by Using Taguchi Method in Selective Laser Sintering", International Journal of Machine Tools & Manufacture, 2007, pp. 985-995, 47.
Seong-Ook Choi et al., "3D Printing Design for Minimizing Flection Phenomenon", The Korea Institute of Electronic Communication Sciences, Dec. 2014, pp. 1415-1420, 9(12).
Sangho Ha et al., "Experimental Design for Reliability Assessment of 3D Printed Products and Components", Conference of The Korean Society of Mechanical Engineers, Nov. 2014, pp. 1002-1003.
S.K. Choi, "3D Printing Technology and Architectural Application", Journal of the Architectural Institute of Korea, pp. 17-25, vol. 58(2).
J.Y. Han, "A Study on the Prototype Modeling Method Using 3D Printing", Journal Packaging Culture Design Research, pp. 97-109, 34.
M.N. Islam et al. "An Investigation of Dimensional Accuracy of Parts Produced by Three-Dimensional Printing", Proceedings fo the World Congress on Engineering, 2013, vol. 1.
H.J. Yang et al. "A Study on Shrinkage Compensation of the SLS Process by Using the Taguchi Method", International Journal of Machine Tools and Manufacture, 2002, pp. 1203-1212, 42(11).

* cited by examiner

[Fig. 1]
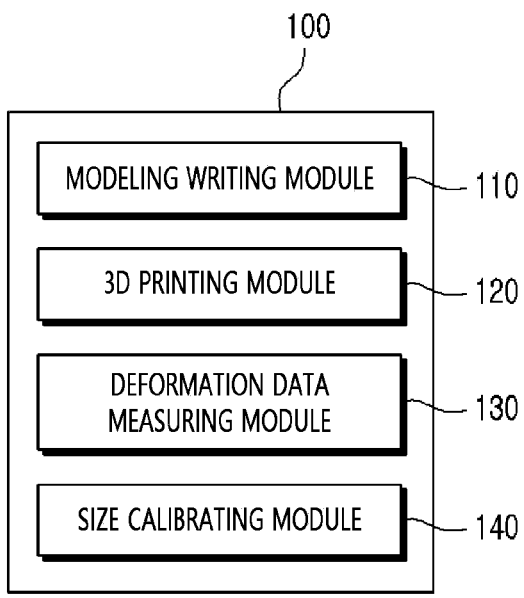

[Fig. 2]
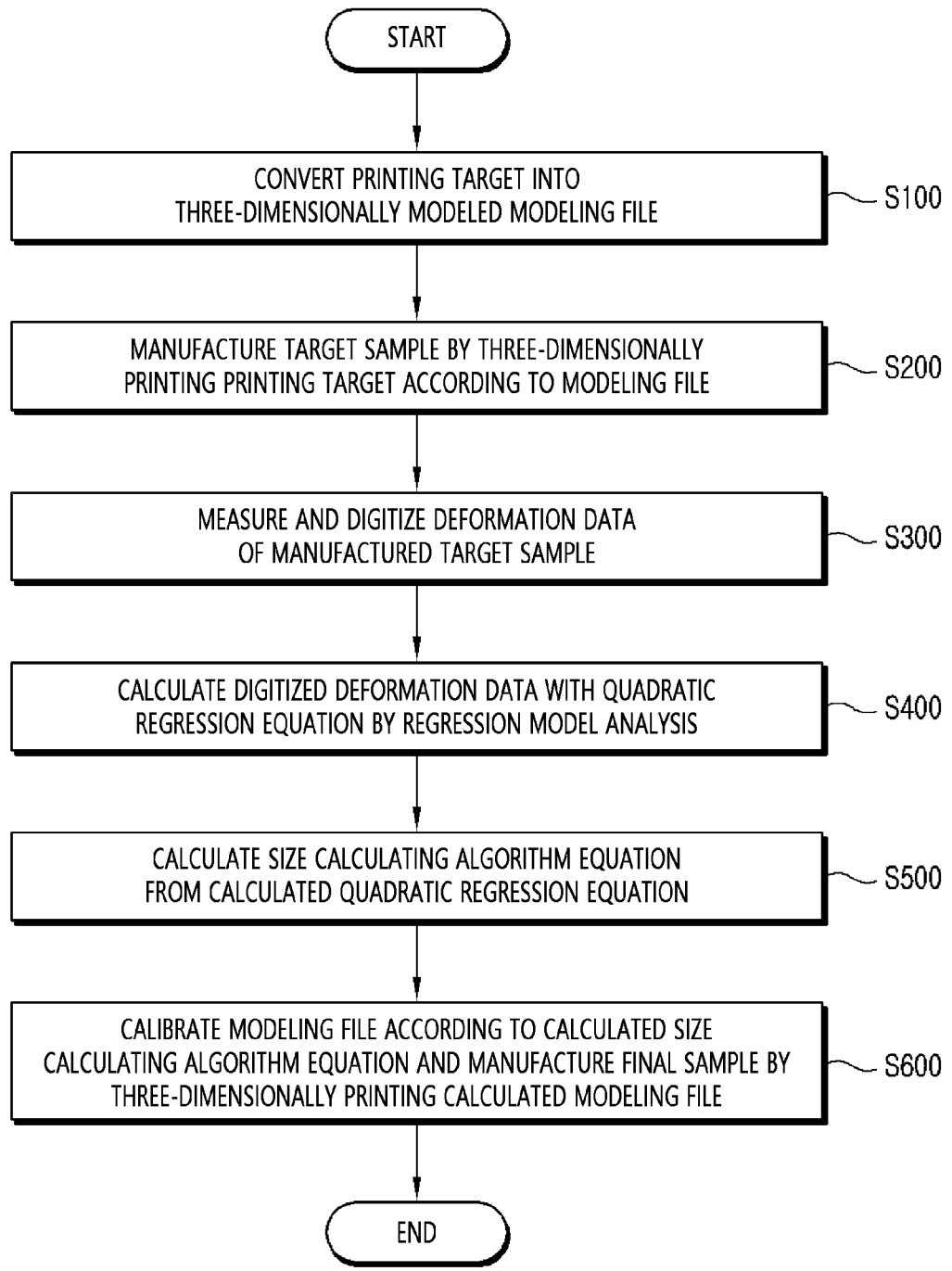

[Fig. 3]
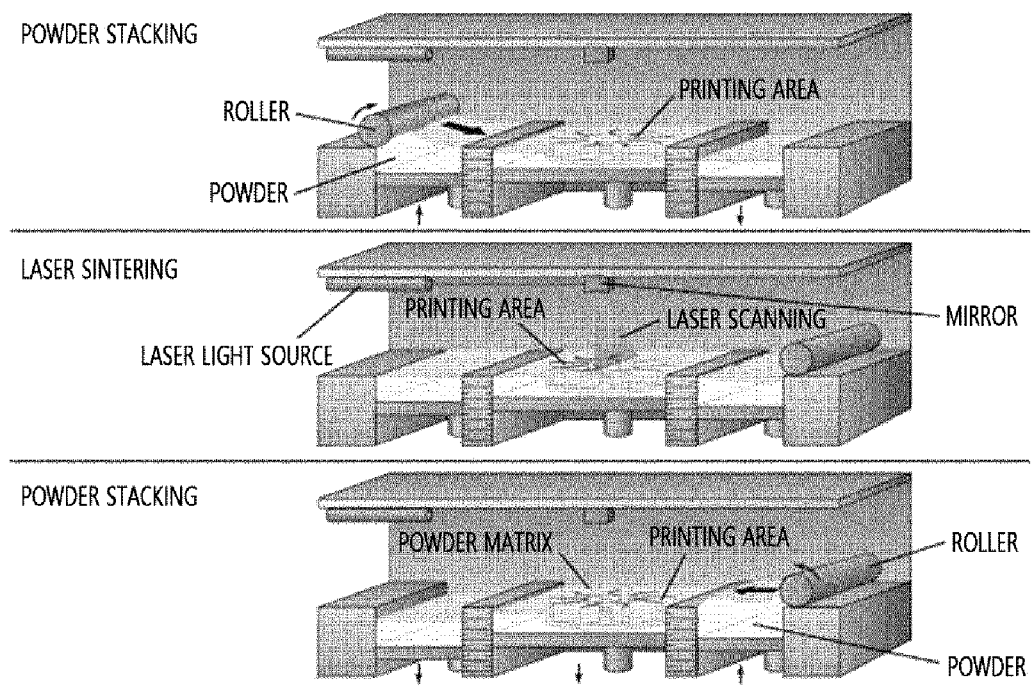
[Fig. 4]
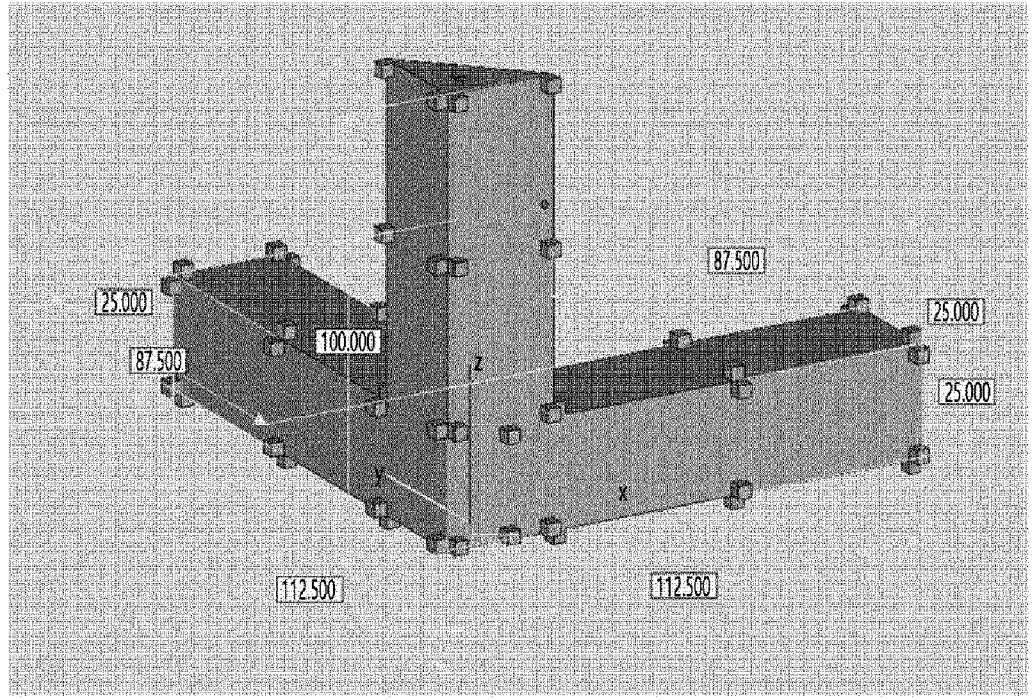

[Fig. 5]
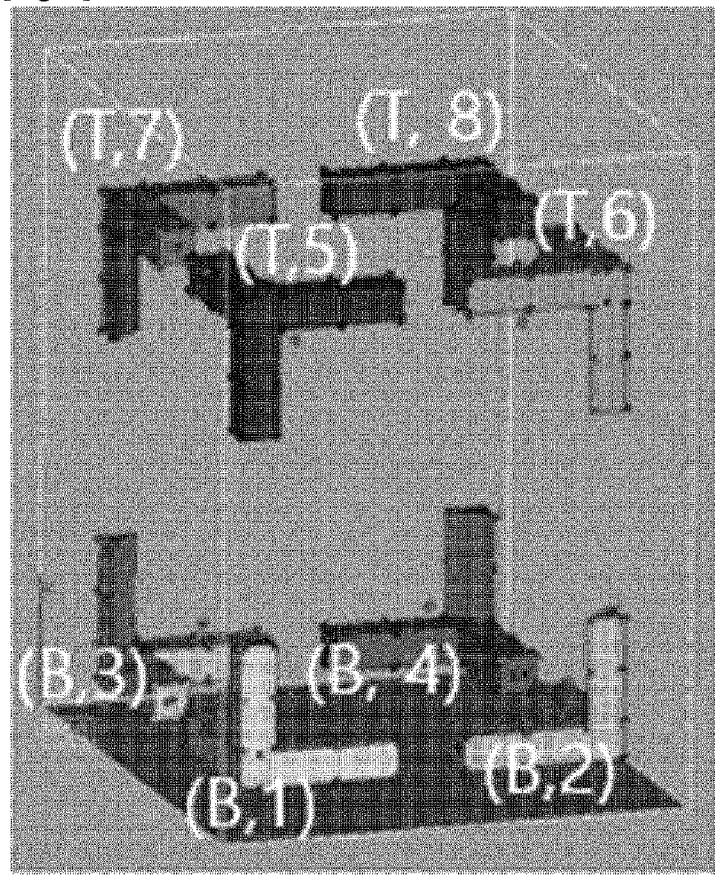

[Fig. 6]
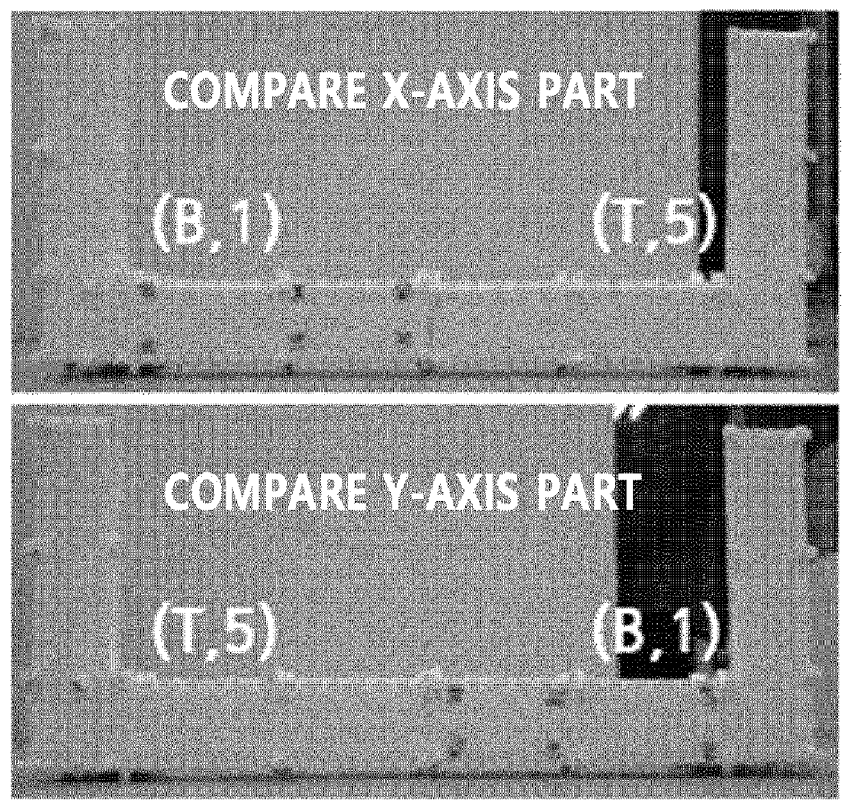

[Fig. 7]
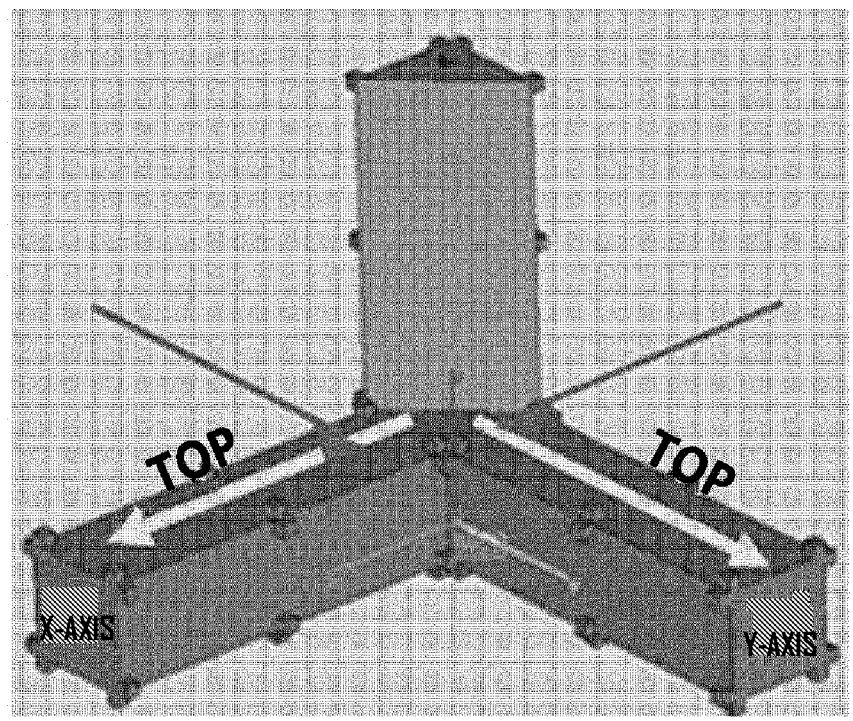

[Fig. 8]
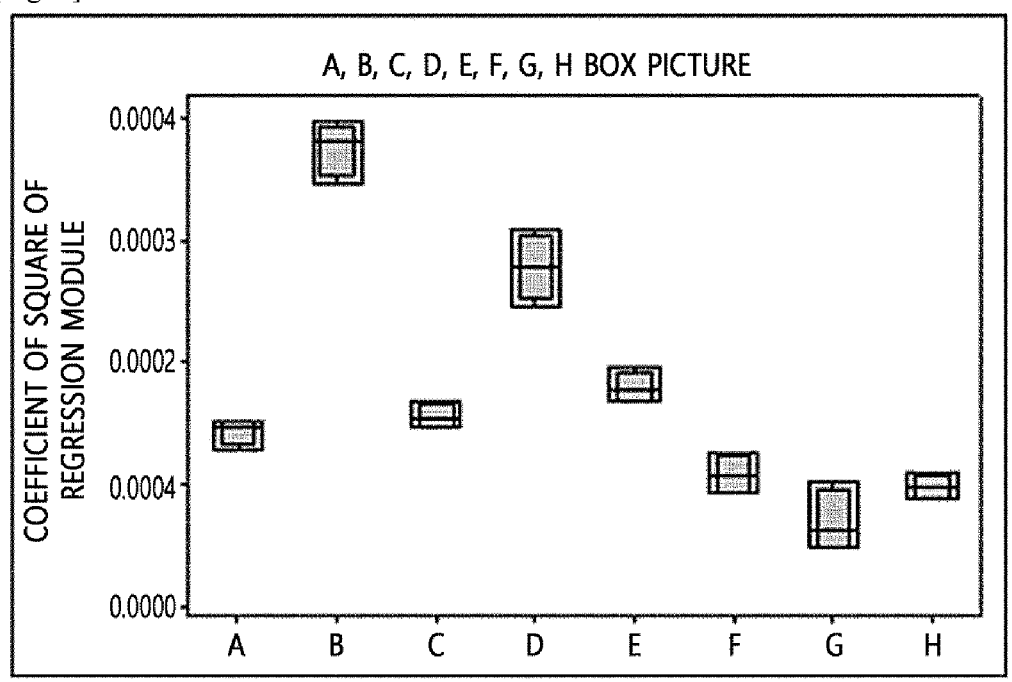

[Fig. 9]
(a)
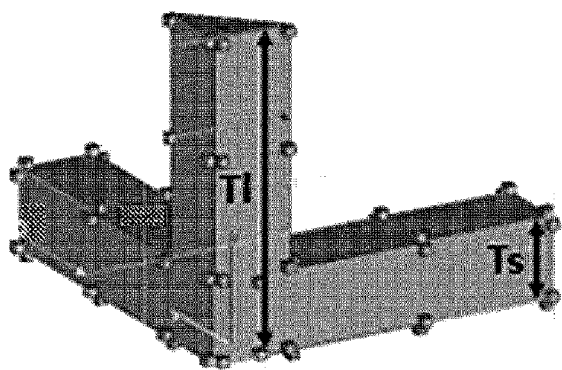
(b)  (c)
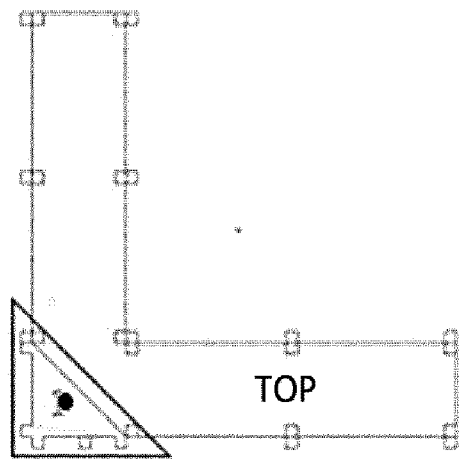
TOP
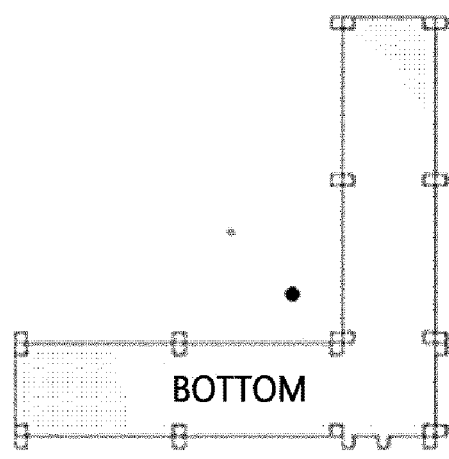
BOTTOM

[Fig. 10]
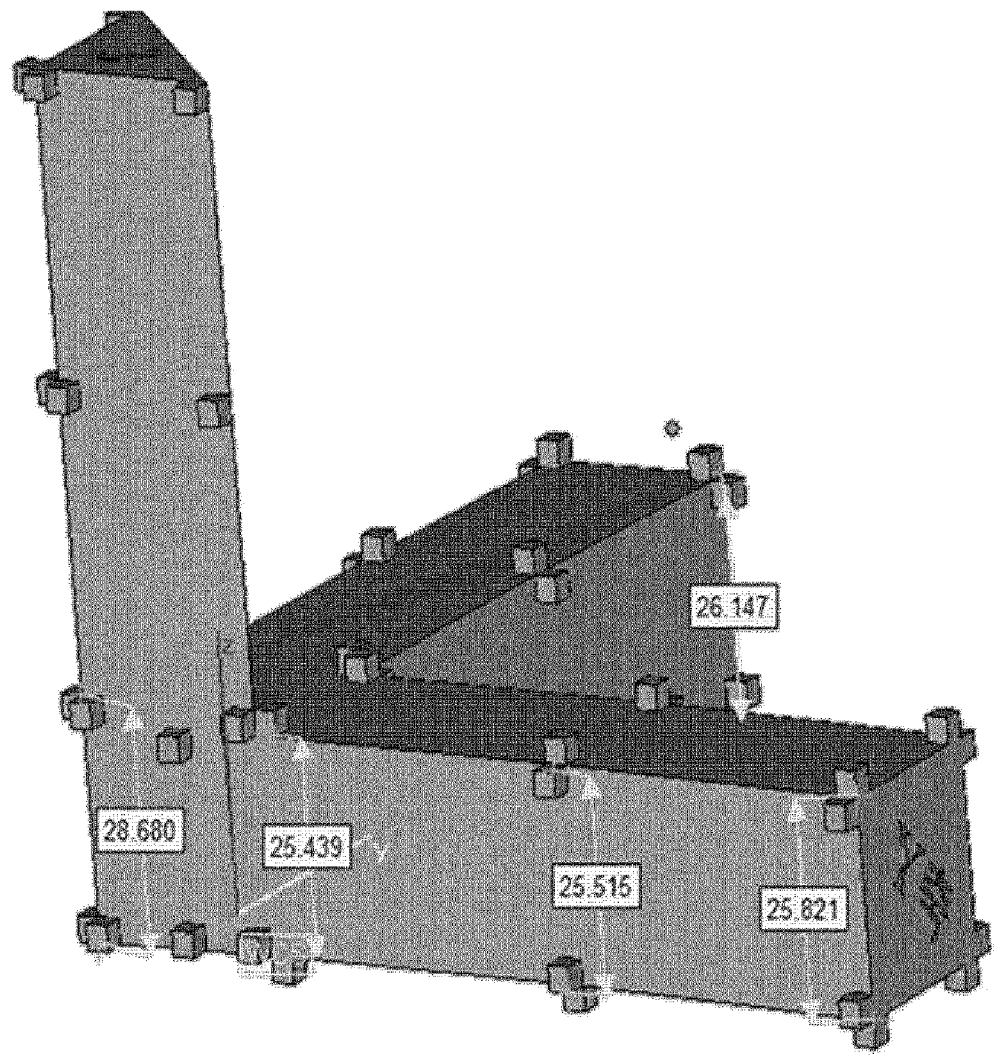

[Fig. 11]
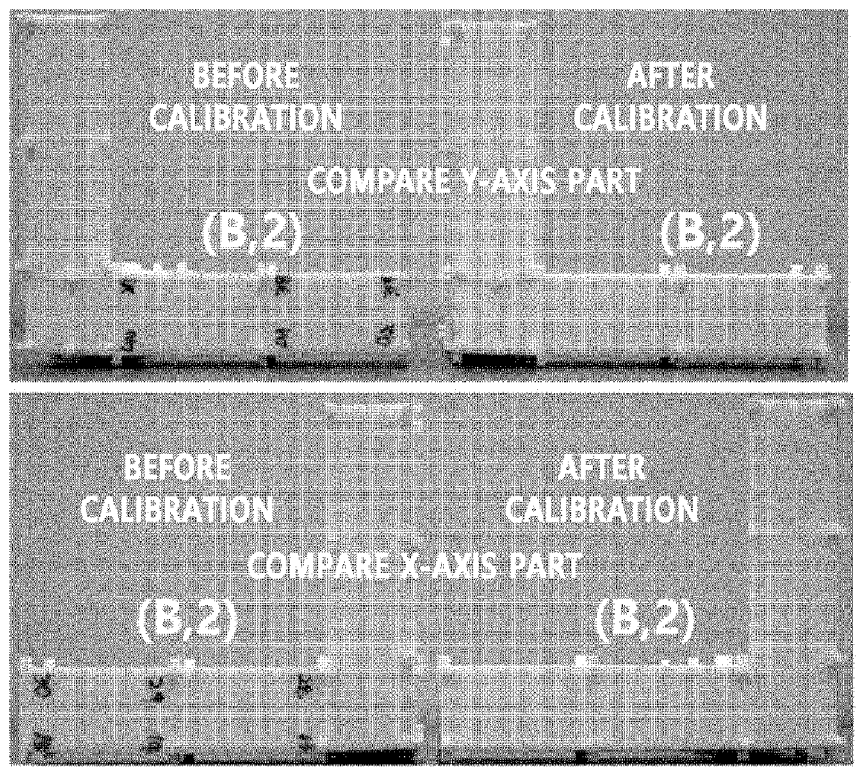

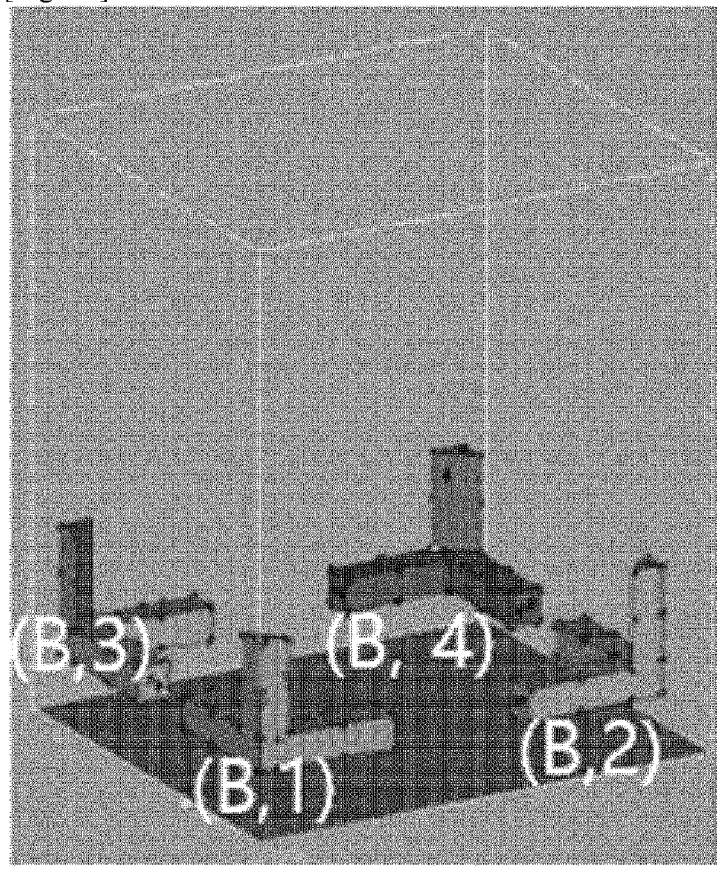
[Fig. 12]

[Fig. 13]

| Axial direction of a target sample that requires calibration | Examples of quadratic regression equations |
|---|---|
| X-axis direction | $Z=aX^2+bX+c$ |
| Y-axis direction | $Z=aY^2+bY+c$ |

[Fig. 14]

| Quadratic coefficient | X axis directional column (A) | | Y axis directional column (C) | |
|---|---|---|---|---|
| Sample | Top (E) | Bottom (F) | Top (G) | Bottom (H) |
| (B,1) | 0.000153 | 0.000382 | 0.000147 | 0.000246 |
| (B,2) | 0.000141 | 0.000345 | 0.000156 | 0.000273 |
| (B,3) | 0.000152 | 0.000381 | 0.000170 | 0.000284 |
| (B,4) | 0.000129 | 0.000398 | 0.000154 | 0.000309 |
| (T,5) | 0.000182 | 0.000127 | 0.000050 | 0.000094 |
| (T,6) | 0.000196 | 0.000116 | 0.000077 | 0.000110 |
| (T,7) | 0.000168 | 0.000094 | 0.000051 | 0.000090 |
| (T,8) | 0.000174 | 0.000099 | 0.000103 | 0.000104 |

[Fig. 15]

|  | Group | P-value | Average | Standard deviation |
|---|---|---|---|---|
| Before calibration | Top of X-axis | 0.001 | 0.000144 | 0.00011 |
| After calibration | | | 0.00089 | 0.00010 |
| Before calibration | Bottom of X-axis | 0.002 | 0.000377 | 0.00022 |
| After calibration | | | 0.000112 | 0.00034 |
| Before calibration | Top of Y-axis | 0.001 | 0.000157 | 0.00010 |
| After calibration | | | 0.00051 | 0.00012 |
| Before calibration | Bottom of Y-axis | 0.007 | 0.000278 | 0.00026 |
| After calibration | | | 0.000123 | 0.00032 |

APPARATUS AND METHOD FOR CALIBRATING OPTIMUM SIZE OF 3D PRINTING

TECHNICAL FIELD

The present invention relates to an apparatus and a method for calibrating an optimum size of a three-dimensional (3D) printing.

BACKGROUND ART

In recent years, the 3D printing technologies have been known to the public as future-leading technologies, and are being distributed to various industrial fields including general personal 3D printers as well as high-performance industrial 3D printers. The 3D printers are classified into industrial 3D printers and 3D printers for supply according to the operational methods and used materials thereof. Fused filament fabrication (FFF) type printers for supply, which use a filament type material, stereo lithography apparatus (SLA) type printers and digital light processing (DLP) type printers that use a thermosetting liquid based material, and industrial selective laser sintering (SLS) type printers that uses nylon based powder and laser light sources (prior documents 1 and 2).

In particular, the domestic and foreign manufacturers recognize early the importance of the 3D printing technologies and introduced high-performance 3D printers to use them in the field of design and development of products. Examples of the 3D printers most widely used in the manufacturing industry may include SLA type printers and SLS printers, and when the products of the manufacturers require high strength and high hardness, components are verified and functional components are manufactured by using the SLS type 3D printers (prior documents 1 and 2). However, the samples manufactured through the SLS type printing techniques that secure a relatively excellent mechanical property are accompanied by dimensional errors due to the thermal deformation, such as thermal expansion and thermal contraction. Here, because the dimensional errors are related to numerous control parameters and the deformation patterns are very complex, it is known that it is difficult to manage the dimensional errors of the SLS type printing. Accordingly, in the SLS 3D printing processes, a method of disposing a sample at the center of a printer part bed and utilizing two thirds of the entire space of the bed is generally recommended to increase the accuracy of the size and shape of the sample. However, the recommendation increases the operation time and the material consumption of the high-performance industrial SLS 3D printers.

In the studies on the dimensional accuracy of the 3D printers, approaches of the other printing technologies and the characteristics of the materials have to be essentially considered. Through investigation of the causes and factors of the dimensional deformation of products, it is possible to consider a method for manufacturing the product more accurately.

In the studies on the dimensional accuracy of the samples manufactured by 3D printers, the dimensional deformation phenomenon was analyzed relatively in detail. The X-Y plane sizes of the samples were always smaller than those of original modeling flies, and the Z-axis (height) sizes of the samples were always larger than those of the original modeling files (prior document 3). Here, the contraction phenomenon of the products occurs while a binding fluid is ejected through an inkjet head and contacts powder. However, prior document 3 analyzed the dimensional deformation phenomenon in detail, but failed to suggest a method for offsetting dimensional errors or a detailed method for improving processes.

It is known that the samples manufactured by using the SLS type 3D printers causes thermal contraction phenomena in many cases. There were study examples, by which it is identified that the thermal contraction is a main cause of deformation, and it was identified that the contraction rates of the parts according to the location and the temperature deviation of the heater of the part bed vary when an actual sample is manufactured, causing deformation of the manufactured part (prior document 4). However, even this study failed to suggest a detailed method for controlling a partial thermal contraction phenomenon.

In general, an SLS 3D printer manufacturer provides a recommended 1D scale factor for calibrating a contraction phenomenon. However, it is essential to consider a more multi-dimensional calibration method to minimize a complex thermal deformation phenomenon and a dimensional deformation for various uncontrollable factors.

PRIOR DOCUMENTS (Non-patent document 1) Choi. S. K. (2014). 3D Printing Technology and Architectural Application. Journal of the Architectural Institute of Korea. Vol. 58(2), 17-25

(Non-patent document 2) Han, J. Y. (2013). A study on the Prototype Modeling Method using 3D Printing. Journal Packaging Culture Design Research, Vol. 34, 97-109.

(Non-patent document 3) Islam, M. N., Boswell, B., & Pramanik, A. (2013). An Investigation of Dimensional Accuracy of Parts Produced by Three-Dimensional Printing. In Proceedings of the World Congress on Engineering (Vol. 1).

(Non-patent document 4) Yang, H. J., Hwang, P. J., & Lee, S. H. (2002). A study on shrinkage compensation of the SLS process by using the Taguchi method. International Journal of Machine Tools and Manufacture, 42(11), 1203-1212.

DISCLOSURE

Technical Problem

The present invention has been made in an effort to solve the above-mentioned problems, and provides an apparatus and a method for investigating and analyzing process control parameters, for example, of parts manufactured by using a 3D printer, recognizing a correlation between deformation tendencies, such as the size and the shape of a sample, predicting deformation of the sample against a manufacturing condition based on the analysis result, and calibrating sample modeling towards alleviation of deformation.

Technical Solution

According to an embodiment of the present invention, there is provided an apparatus for calibrating an optimum size of 3D printing, the apparatus including a modeling writing module that writes a modeling file by three-dimensionally modeling a printing target, a 3D printing module that manufactures a target sample by three-dimensionally printing the written modeling file, a deformation data measuring module that measures and digitizes deformation data of the manufactured target sample, and a size calibrating module that calculates a size calibrating algorithm equation through a regression model analysis of the digitized deformation data, wherein the size calibrating module calibrates the modeling file according to the calculated size calibrating algorithm equation, and wherein the 3D printing module manufactures a final target sample by three-dimensionally printing the calibrated modeling file.

Preferably, the deformation data of the target sample may be digitized by measuring deflection data of opposite surfaces of an axial direction of a part that requires calibration of the manufactured target sample, and the digitized deflection data may be calculated with a predetermined quadratic regression equation.

Preferably, the size calibrating algorithm equation is predetermined.

Preferably, the 3D printing module may be a selective laser sintering (SLS) 3D printer.

According to an embodiment of the present invention, there is provided a method for calibrating an optimum size of 3D printing, the method including (a) converting a printing target into a three-dimensionally modeled modeling file, (b) manufacturing a target sample by three-dimensionally printing the printing target according to the written modeling file, (c) measuring and digitizing deformation data of the manufactured target sample, (d) calculating the digitized deformation data with a quadratic regression equation through a regression model analysis, (e) calculating a size calibrating algorithm equation from the calculated quadratic regression equation, and (f) manufacturing a final target sample by calibrating and three-dimensionally printing the modeling file according to the calculated size calibrating algorithm equation.

Preferably, (c) includes measuring and digitizing deflection data of opposite surfaces of an axial direction of a part that requires calibration of the manufactured target sample, and (d) includes calculating the digitized deflection data with a predetermined quadratic regression equation Preferably, the size calibrating algorithm equation is predetermined.

Advantageous Effects

In accordance with the apparatus and the method for calibrating an optimum size of 3D printing according to the present invention, a deformation/deflection phenomenon calibrating effect that is more excellent that the conventional one may be obtained by calculating data of the dimensional deformation in the X-axis, Y-axis, and Z-axis directions due to disposition of the 3D printing apparatus with coefficients of a quadratic regression curve and by performing calibration against a deflection prediction by applying a size calibrating algorithm equation.

Further, deformation that cannot be controlled through a scale factor adjusting method directly provided by a 3D printer control program may be alleviated.

DESCRIPTION OF THE INVENTION

FIG. 1 is a schematic diagram of an apparatus for calibrating an optimum size of 3D printing according to an embodiment of the present invention;

FIG. 2 is a flowchart of the method for calibrating an optimum size of 3D printing according to an embodiment;

FIG. 3 is a view for explaining a printing process of a general 3D printer;

FIG. 4 is an exemplary view of a 3D modeling file of a target sample;

FIG. 5 is a disposition view of a target sample in a printer bed;

FIG. 6 compares deflections of target samples;

FIG. 7 is a view illustrating measurement of deformation data of a target sample;

FIG. 8 is a view illustrating tendencies of target samples in groups through a quadratic regression coefficient;

FIG. 9 is a view for explaining a size calibrating algorithm equation;

FIG. 10 is an example of a modeling file of a target sample, of which a size is calibrated by a size calibrating algorithm equation;

FIG. 11 compares a target sample before and after calibration; and

FIG. 12 is a disposition view of a calibrated final target sample in a printer bed.

FIG. 13 is a table showing axial direction components and corresponding quadratic regression equations.

FIG. 14 is a table showing quadratic coefficient samples and corresponding X-axis and Y axis values.

FIG. 15 is a table showing before and after calibration values of a T-test.

BEST MODE

The objectives, features, and other advantages of the present invention will be more apparent by describing exemplary embodiments of the present invention in detail with reference to the accompanying drawings. It should be noted that the drawings are not to precise scale and may be exaggerated in thickness of lines or size of components for descriptive convenience and clarity. In addition, terms used herein are defined by taking functions of the present invention into account and can be changed according to user or operator custom or intention. Therefore, definition of the terms should be made according to the overall disclosure set forth herein.

Further, the embodiments are provided exemplarily for description of the present invention, and are not intended to limit the technical scope of the present invention.

The elements that constitute the apparatus for calibrating an optimum size of 3D printing according to the present invention may be integrally used or separately used according to necessities. Further, some elements may be omitted according to the usage of the apparatus.

Hereinafter, an apparatus for calibrating an optimum size of 3D printing 100 (hereinafter, will be simply referred to as 'a calibration apparatus' for convenience of description) according to an embodiment of the present invention will be described in detail with reference to the accompanying drawings.

As illustrated in FIG. 1, the calibration apparatus 100 according to the embodiment of the present invention includes a modeling writing module 110, a 3D printing module 120, a deformation data measuring module 130, and a size calibrating module 140.

The modeling writing module 110 models a printing target 3-dimensionally and writes a modeling file. The modeling writing module 110 may be a device, such as a computer, in which a 3D modeling program is stored and driven, and an example of the 3D modeling program may include a 3D modeling program, such as computer aided design (CAD) or computer aided manufacturing (CAM) but the present invention is not limited thereto.

The 3D printing module 120 manufactures a target sample by three-dimensionally printing a printing target according to a value of the printing target of the modeling file written by the modeling writing module 110. The 3D printing module 120 is a device, such as a general 3D printer, which may perform 3D printing, and the printing material and methods of the 3D printing module 120 may be various but an SLS type 3D printer is preferable.

The SLS type 3D printer uses a principle of creating the shape of a product by selectively irradiating a strong CO2 laser beam and sintering and stacking a powder material, similarly to a photo-curable resin forming method, such as an SLA method and a DLP method. The material of the SLS 3D printer may be powder of various materials, and among them, nylon-based powder may be mainly used and sometimes metallic powder may be used to produce a metal product so that a product may be manufactured by selecting a material according to the purpose thereof.

The principle of the SLS method is as illustrated in FIG. 3. Powder is sintered by irradiating a laser beam in correspondence to the cross-section of the sample while an X-Y scanning mirror in the printer is moved in the X-axis and Y-axis directions. Next, the part bed in which the sintered powder is present is further lowered and one of the two opposite powder keeping containers, to which a roller is close, is raised. Further, the roller is moved towards the opposite powder keeping container while pushing the powder overflowing from the keeping container, and the powder is filled by the roller by a degree by which the part bed is further lowered. A three-dimensional shape is formed by repeating the above-mentioned process until the sample is finished. The advantage of the SLS type 3D printer is that the sample is strong and durable, a product may be manufactured without any supporter, various kinds of powder may be used, and powder that is not sintered may be reused. Meanwhile, the disadvantage of the SLS type 3D printer requires a time for cooling after manufacturing of the product and requires post-processing for removing powder, and dimensional deformation may occur due to various factors. The important technical spirit of the present invention is to calibrate the dimensional deformation.

The deformation data measuring module 130 measure deformation data of a printed target sample. The deformations of the target sample may include deflection, wearing, and damage. The deformation data measuring module 130 is a unit for measuring deformation data, and various gauges may be used but preferably, a roughness/shape measuring unit may be used. The roughness/shape measuring unit is a device that allows measurement of deformation of a shape of a higher precession by allowing measurement of a roughness of a surface and a contour of the shape of the product.

The deformation data measuring module 130 digitize and store the measured deformation data.

The size calibrating module 140 calculates the digitized deformation data with a quadratic regression equation through a regression model analysis, calculates a size calibrating algorithm again with the calculated quadratic regression equation, calibrates the value of the modeling file according to the calculated size calibrating algorithm equation, and manufactures an optimally calibrated final target sample by three-dimensionally printing the calibrated modeling file, which will be described below.

Hereinafter, a method for calibrating an optimum size of 3D printing (hereinafter, will be simply referred to as 'a calibration method' for convenience of description) according to an embodiment of the present invention will be described in detail through experimental examples and verifications.

FIG. 2 is a flowchart of a calibration method according to an embodiment of the present invention.

First, a printing target is written as a modeling file that is modeled three-dimensionally (S100).

The target that is to be printed by using the modeling writing module is modeled by using a 3D modeling program. An example of the 3D modeling is illustrated in FIG. 4.

Next, a target sample is manufactured by three-dimensionally printing the printing target according to the written modeling file of the printing target (S200).

The printing target is printed with a 3D printing apparatus by using the values of the modeling file.

Next, the deformation data of the manufactured target sample is measured and digitized (S300).

The deformation data of the target sample is measured by using the deformation data measuring module 130, and as illustrated in FIG. 5, the target sample is disposed in a part bed in the laser sintering 3D printer to be manufactured.

After the manufactured target samples were analyzed by naked eyes first, the tops T of the X-axis and Y-axis columns of the target samples were less deflected than the bottoms B thereof and the deformations thereof in the Z-axis direction were not observed. However, as illustrated in FIG. 6, it could be observed that the bottoms of the X-axis and Y-axis columns were deformed greatly so as not to be horizontal with the floor. Further, it could be seen that the four samples disposed above the part bed of the printer in the Z-axis direction were less deflected than the four samples disposed below the part bed of the printer in the Z-axis direction. FIG. 6 is a picture for comparing a sample (B, 1) disposed below the part bed and a (T, 5) target sample (T, 5) disposed above the part bed.

The tops and bottoms of the X-axis and Y-axis columns of the eight samples, of which deflections were observed by naked eyes, were measured by a roughness/shape measuring unit and the deflections are converted into number data. The roughness/shape measuring unit performs measurements by scanning the tops and bottoms of the samples in the X-axis and Y-axis directions, and the result is as illustrated in FIG. 7.

That is, deformation data of one surface (a top) and an opposite surface (a bottom) of the target sample in the axial direction as parts that require calibration of the target sample may be measured. The shape deformation data of the top and the bottom of the part of the target sample in the X-axis and Y-axis directions may be measured.

Next, the digitized deformation data is calculated with a quadratic regression equation through a regression model analysis (S400).

After the measurement of the deformation data, a quadratic functional equation on the deflection is calculated through the regression analyses of the digitized deformation data of the target samples. It can be seen from the quadratic functional equation that the deflection tendencies of the tops and the bottoms of the target samples may be expressed with a quadratic equation. Further, it can be seen that the calculated $R^2$ values of the quadratic regression models of the samples correspond to a quadratic regression equation that may be reliable by about 99%, and an equation was derived in the form of a quadratic regression equation as in FIG. 13. Further, in order to recognize a degree of defection, only quadratic coefficients a that represent the quadratic curves of the quadratic equation are extracted and the linear coefficients b and the constants C were not compared.

FIG. 14 represents quadratic coefficient data of the calculated quadratic regression equation, which may be different according to the equipment used in the respective modules.

Further, in order to recognize the tops and bottoms at the parts in the X-axis and Y-axis directions and the tendencies of the degree of deflection according to the lower dispositions and upper dispositions of the part bed of the printer, the result was classified into eight groups (group A to H of FIG. 14) and the box plots for the groups were drawn as illustrated in FIG. 8.

Referring to FIG. 8, the differences between the deflections of the tops and bottoms of the target samples disposed below the part bed of the printer were greater than those of the samples disposed above the part bed. Further, it can be seen through the box plots that the degrees of deflection of the target samples disposed below the part bed are generally greater than those of the target samples disposed above the part bed.

Next, a size calibrating algorithm equation is calculated from the calculated quadratic regression equation (S400).

The size calibrating module 140 calculates a size calibrating algorithm equation from the quadratic regression equation, which is as Equation 1.

$$Z_0 = Zi - \left(YCB - \frac{YCB - YCT}{Ts}Zi\right) \times \left(Yi - CPYB + \frac{CPYB - CPYT}{Tl}Zi\right)^2 - \left(XCB - \frac{XCB - XCT}{Ts}Zi\right) \times \left(Xi - CPXB + \frac{CPXB - CPXT}{Tl}Zi\right)^2 \qquad \text{[Equation 1]}$$

In Equation 1,

Xi, Yi, and Zi: X, Y, and Z values of a modeling file size,

Zo: Z coordinate values of vertexes of modeling files after calibration, (X or Y) C (B or T): a quadratic coefficient value of a quadratic regression a(X or Y)$^2$+b(X or Y)+c=Z of a bottom B or a top T, T(l or s): a height value (Tl) of a longest part or a height value (Ts) of a shortest part of FIG. 9A, CP(X or Y)T: a (X or Y) coordinate value of the center of a surface of a triangular part of FIG. 9A, and CP(X or Y)B: a (X or Y) coordinate value of the center of a surface of a bottom of FIG. 9A.

The calibration of the size is applied only to a Z-axis directional coordinate of information that is an apex of the modeling file, and the X and Y coordinates of the apexes are the same as the coordinates before calibration. In Equation 1, (1) and (3) are equations representing that the change of the quadratic coefficient according to the change of the height is linear through the quadratic coefficient data of the quadratic regression equation in FIG. 14. Accordingly, the value corresponding to the bottom of FIG. 14 becomes a coefficient value at the top (Z=0), and the value of the top becomes a coefficient value at the height of the top.

(2) and (4) of Equation 1 represent that the center of deflection (curvature) according to height changes, and the target sample as in FIG. 9A was set such that the centers of curvatures of the top and bottom of the triangle at a high part of the target sample are the centers of weight of the surfaces as illustrated by dots in FIGS. 9B and 9C. Further, the size calibrating algorithm was calculated with the assumption that the movements of the locations of the centers of weight of the sections are assumed to be linear according to the heights thereof.

Next, the modeling file is calibrated according to the calculated size calibrating algorithm equation, and is three-dimensionally printed so that the target final sample is manufactured (S600).

The target sample is printed with a 3D printing apparatus by applying the calculated size calibrating algorithm equation to the modeling file and calibrating the sizes of the target sample of the modeling file to manufacture a final target sample.

In the experiment, the size calibrating algorithm was applied to the four target samples disposed below the part bed, which showed a remarkable deflection tendency in the box plot illustrated in FIG. 8. A calibrated STL file was derived by applying the size calibrating algorithm to an STL file corresponding to original CAD modeling. FIG. 10 illustrates an STL file in which the size calibrating algorithm is applied to one (B, 3) of the target samples disposed below the part bed.

A Z-axis directional deflection is generated with reference to X-axis and Y-axis relative coordinates of the samples by the size calibrating algorithm, and the deflection in the Z coordinate is calibrated in a direction that is opposite to the deflection according to the degree of deflection to be calibrated as illustrated in FIG. 11. In order to make the calibrated STL file the same as the first experimental condition, the calibrated final target sample in the printer was disposed at a location as in FIG. 12.

In the naked eye analysis result of the manufactured final target sample and the target sample before the calibration, the target sample before the calibration came out while the bosses do not contact the floor due to the large deflection of the bottom, but the bosses of the bottom of the newly manufactured final target sample contact the floor so that the final target sample has a stable posture.

The calibrated four final target samples were measured by a roughness/shape measuring unit, and a quadratic regression equation was derived based on number data and the coefficient of the quadratic term of the quadratic regression equation was listed. A T-test of two samples was carried out to verify a calibration effect based on the listed table.

Because the disposition of the samples in the 3D printer is related to deformation of the sizes of the product, a paired T-test was carried out to analyze the deformation of the sizes. FIG. 15 is a table that summarizes a paired T-test of two samples, which was analyzed with a reliability level of 95%, and it can be seen that the deflection phenomenon was improved with the effect of the size calibrating algorithm because P-values of all the groups is less than 0.05.

In accordance with the apparatus and the method for calibrating an optimum size of 3D printing according to the present invention, a deformation/deflection phenomenon calibrating effect that is more excellent than the conventional one may be obtained by calculating data of the dimensional deformation in the X-axis, Y-axis, and Z-axis directions due to disposition of the 3D printing apparatus with coefficients of a quadratic regression curve and by performing calibration against a deflection prediction by applying a size calibrating algorithm equation and performing a calibration in a direction that is opposite to a predicted deflection.

Further, deformation that cannot be controlled through a scale factor adjusting method directly provided by a 3D printer control program may be alleviated.

Although the preferred embodiments of the present invention have been described, the present invention is not limited to the embodiments. That is, the present invention may be variously changed and corrected by those skilled in the art to which the present invention pertains without departing from the spirit and scope of the claims, and all the modifications and equivalents have to be regarded as pertaining to the scope of the present invention.

DESCRIPTION OF REFERENCE NUMERALS

100: Apparatus for calibrating an optimum size of 3D printing
110: Modeling writing module
120: 3D printing module
130: Deformation data measuring module
140: Size calibrating module

The invention claimed is:

1. An apparatus for calibrating an optimum size of 3D printing, the apparatus comprising:
   a computer that writes a modeling file by three-dimensionally modeling a printing target;
   a 3D printer that manufactures a target sample by three-dimensionally printing the written modeling file;
   a scanner that measures and digitizes deformation data of the manufactured target sample,
   wherein the deformation data of the target sample is digitized by measuring deflection data of one surface and opposite surface in an axial direction of a part that requires calibration of the manufactured target sample; and
   a calculator that is programed to calculate a size calibrating algorithm equation by a regression model analysis of the digitized deformation data,
   wherein the apparatus is configured to calibrate the modeling file according to the calculated size calibrating algorithm equation,
   wherein the size calibrating algorithm equation is determined as follows:

$$Z_0 = Zi - \left(YCB - \frac{YCB - YCT}{Ts}Zi\right) \times \left(Yi - CPYB + \frac{CPYB - CPYT}{Tl}Zi\right)^2 - \left(XCB - \frac{XCB - XCT}{Ts}Zi\right) \times \left(Xi - CPXB + \frac{CPXB - CPXT}{Tl}Zi\right)^2,$$

and
   wherein $Z_o$: Z coordinate values of vertexes of modeling files after calibration,
   $Xi$, $Yi$, and $Zi$: X, Y, and Z values of a modeling file size of the target sample,
   (X or Y) C (B or T): a quadratic coefficient value of a quadratic regression equation $a(X \text{ or } Y)^2 + b(X \text{ or } Y) + c = Z$ of a bottom B or a top T of the axial direction of a part that requires calibration of the target sample,
   T(l or s): a height value (Tl) of a longest part or a height value (Ts) of a shortest part of an axial direction of the target sample,
   CP(X or Y)T: an (X or Y) coordinate value of the center of weight of a form on a top of the longest part; and
   CP(X or Y)B: an (X or Y) coordinate value of the center of weight of a form on a bottom of the target sample, and
   wherein the 3D printer is configured to manufacture a final target sample by three-dimensionally printing the calibrated modeling file.

2. The apparatus of claim 1, wherein the 3D printer is a selective laser sintering (SLS) 3D printer.

3. A method for calibrating an optimum size of 3D printing using the apparatus of claim 1, the method comprising:
   (a) converting a printing target into a three-dimensionally modeled modeling file;
   (b) manufacturing a target sample by three-dimensionally printing the printing target according to the written modeling file;
   (c) measuring and digitizing deformation data of the manufactured target sample;
   (d) calculating the digitized deformation data with a quadratic regression equation by a regression model analysis;
   (e) calculating a size calibrating algorithm equation from the calculated quadratic regression equation; and
   (f) manufacturing a final target sample by calibrating and three-dimensionally printing the modeling file according to the calculated size calibrating algorithm equation.

4. The method of claim 3, wherein (c) comprises:
   measuring and digitizing deflection data of one surface and opposite surface in an axial direction of a part that requires calibration of the manufactured target sample, and
   wherein (d) comprises:
   calculating the digitized deflection data with a quadratic regression equation as follows:

$$Z = a(\text{axial direction})^2 + b(\text{axial direction}) + c.$$

* * * * *